US012783940B2

(12) United States Patent
Zhou et al.

(10) Patent No.: US 12,783,940 B2
(45) Date of Patent: Nov. 3, 2026

(54) TRANSFER KNOWLEDGE FROM AUXILIARY DATA FOR MORE INCLUSIVE MACHINE LEARNING MODELS

(71) Applicant: AT&T Intellectual Property I, L.P., Atlanta, GA (US)

(72) Inventors: Zhengyi Zhou, Chappaqua, NY (US); Cheryl Brooks, Maplewood, NJ (US); Aritra Guha, Edison, NJ (US); Yaron Kanza, Fair Lawn, NJ (US); Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1014 days.

(21) Appl. No.: 17/935,747

(22) Filed: Sep. 27, 2022

(65) Prior Publication Data

US 2024/0104422 A1 Mar. 28, 2024

(51) Int. Cl.
*G06N 20/00* (2019.01)

(52) U.S. Cl.
CPC .................................... *G06N 20/00* (2019.01)

(58) Field of Classification Search
CPC ............................... G06N 20/00; G06N 3/096
See application file for complete search history.

(56) References Cited

U.S. PATENT DOCUMENTS

| | | | | |
|---|---|---|---|---|
| 2008/0300797 | A1* | 12/2008 | Tabibiazar | G16B 40/30 702/19 |
| 2019/0017839 | A1* | 1/2019 | Eyler | G01C 21/3438 |
| 2019/0304603 | A1* | 10/2019 | Takata | G06N 20/00 |
| 2021/0042629 | A1* | 2/2021 | Ezov | G06N 5/02 |
| 2021/0241035 | A1* | 8/2021 | Sutherland | G06V 10/7784 |
| 2021/0241037 | A1* | 8/2021 | Lisowska | G06F 18/211 |
| 2021/0406601 | A1* | 12/2021 | Narlikar | G06F 16/55 |
| 2022/0207865 | A1* | 6/2022 | Muhammad | G06F 16/35 |
| 2023/0004991 | A1* | 1/2023 | Herman-Saffar | G06F 18/214 |

OTHER PUBLICATIONS

Dai et al., "Boosting for Transfer Learning," in Proc. 24th International Conference on Machine Learning, Corvalis, Jun. 2007, pp. 193-200, 8 pages.

(Continued)

*Primary Examiner* — Tamara T Kyle
*Assistant Examiner* — William Wong
(74) *Attorney, Agent, or Firm* — Guntin & Gust, PLC; Erik Boyd

(57) ABSTRACT

Transfer knowledge from auxiliary data for more inclusive machine learning models is provided. A method can include generating a common feature space comprising first data features, wherein the first data features are present in training data used to train a first machine learning model, and wherein the first data features are present in auxiliary data that are independent of the training data; generating a combined learned feature representation, the combined learned feature representation being representative of the first data features of the common feature space and second data features that are unique to the training data; and training a second machine learning model based on the combined learned feature representation.

20 Claims, 12 Drawing Sheets

(56) References Cited

OTHER PUBLICATIONS

Hoffer, "Pokemon GO Isn't Great in Rural Areas," https://comicbook.com/news/pokemon-go-isnt-great-in-rural-areas/, Sep. 6, 2017, 3 pages.

Baker, "Why 'Pokemon Go' Sucks in the Suburbs," Rolling Stone, https://www.rollingstone.com/culture/culture-news/why-pokemon-go-sucks-in-the-suburbs-103309/, Jul. 21, 2016, 4 pages.

Hargarten, "Why some places in Minnesota are better for playing Pokemon GO than others," StarTribune, https://www.startribune.com/why-some-places-in-minnesota-are-better-for-playing-pokemon-go-than-others/388985262/, Aug. 3, 2016, 2 pages.

Guha et al. ,"Simulating Training Data to Mitigate Biases in Machine Learning Models," U.S. Appl. No. 17/661,026, filed Apr. 27, 2022, 32 pages.

* cited by examiner

TRANSFER KNOWLEDGE FROM AUXILIARY DATA FOR MORE INCLUSIVE MACHINE LEARNING MODELS

TECHNICAL FIELD

The present disclosure relates to machine learning, and, in particular, to techniques facilitating transfer knowledge for machine learning models.

BACKGROUND

Machine learning (ML) is currently used in a wide variety of applications, e.g., to direct and/or automate decision making based on ML models. However, current techniques for creating and training ML models often have shortcomings due to under-representation of respective demographic groups, either in the training and testing datasets or through the model parameters themselves. Accordingly, it is desirable to implement techniques that can reduce bias and improve inclusiveness of ML models.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a method as described herein can include generating, by a device including a processor, a common feature space including first data features, where the first data features are present in training data used to train a first machine learning model, and where the first data features are present in auxiliary data that are independent of the training data. The method can also include generating, by the device, a combined learned feature representation, the combined learned feature representation being representative of the first data features of the common feature space and second data features that are unique to the training data. The method can additionally include training, by the device, a second machine learning model based on the combined learned feature representation.

In another aspect, a system as described herein can include a processor and a memory that stores executable instructions that, when executed by the processor, facilitate performance of operations. The operations can include generating a feature space including first data features, where the first data features are present in training data used to train a first machine learning model, and where the first data features are present in auxiliary data that is independent of the training data. The operations can additionally include generating a combined feature representation, the combined feature representation being representative of the first data features and second data features that are unique to the training data. The operations can further include training a second machine learning model using the combined feature representation.

In a further aspect, a non-transitory machine-readable medium as described herein can include executable instructions that, when executed by a processor of a first device, facilitate performance of operations. The operations can include generating a data feature space including first data features, where the first data features are present in training data used to train a first machine learning model, and where the first data features are present in auxiliary data that are independent of the training data; generating a learned feature representation, the learned feature representation being representative of the first data features and second data features unique to the training data; and training a second machine learning model based on the learned feature representation.

Figure 1:
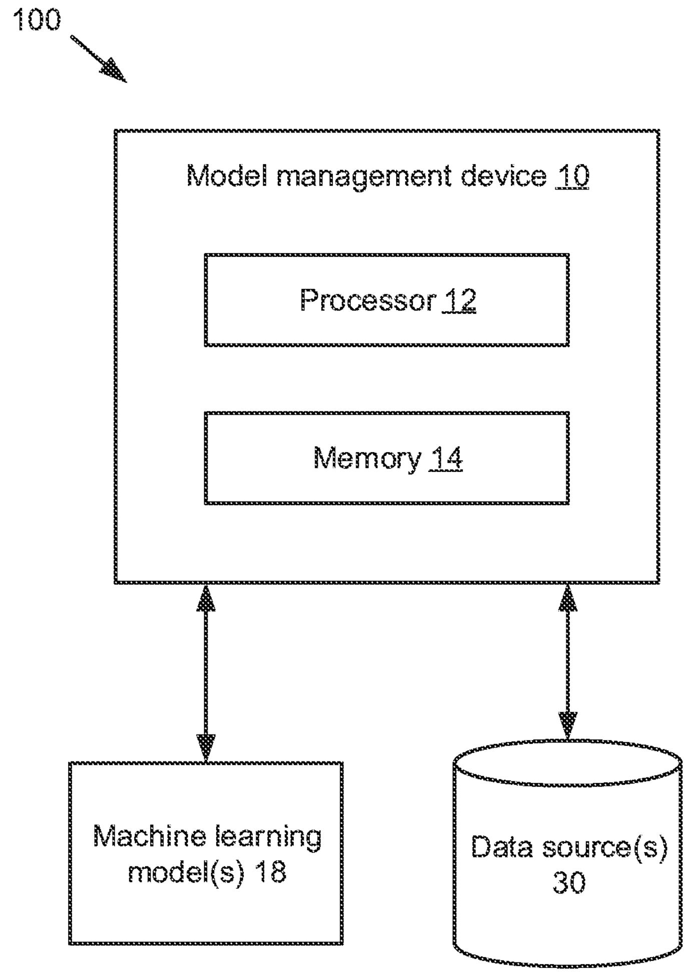
FIG. 1 is a block diagram of a system that facilitates transfer knowledge from auxiliary data for more inclusive machine learning models in accordance with various aspects described herein.

Referring first to FIG. 1, a system 100 that facilitates transfer knowledge from auxiliary data for more inclusive ML models is illustrated. System 100 as shown by FIG. 1 includes a model management device 10 that can generate, train, and/or otherwise manage respective ML models 18 in accordance with respective implementations as described herein. The model management device 10 can be any suitable computing device, such as a server, a desktop workstation, or the like. While the model management device 10 is shown in FIG. 1 as a single entity for purposes of illustration, it is noted that the model management device 10 could also be implemented via a computing cluster and/or any suitable network of multiple individual computing devices. In still other implementations, the model management device 10 could be a virtual device, e.g., a virtual machine implemented via a function of a cloud computing platform.

As further shown in FIG. 1, the model management device 10 can, in association with training, generation, and/or management of the ML model(s) 18, utilize data stored at and/or otherwise associated with respective data sources 30. Data associated with the data source(s) 30 can include, but is not limited to, training data for respective ML models 18, auxiliary data for the ML models 18 (as will be described in further detail below), and/or any other suitable data.

As noted above, while ML has been used in numerous applications, several reports have arisen about its shortcomings due to under-representation of certain demographic groups, e.g., in training and/or testing datasets and/or in model parameters themselves. Implementations as described herein address these shortcomings by utilizing additional relevant data that could be useful in reducing model bias and/or identifying new features that could improve the overall quality of predictions. For instance, the model management device 10 shown in FIG. 1 could utilize curated datasets, e.g., datasets stored by the data source(s) 30, that contain information for minority and/or other under-represented groups. Such datasets are referred to herein as "auxiliary" datasets. By way of example, an auxiliary dataset could be created for respective applications, that are independent of any underlying ML models, to aid in diversity, equity, and inclusion (DEI) efforts. Other auxiliary datasets could also be used.

One use for auxiliary datasets as described above is to help reduce bias in ML models by providing additional information for an otherwise under-represented group in the training data. However, many of these auxiliary datasets are associated with databases that are crowdsourced and may lack elements that are desirable for ML modeling purposes. For example, in many cases, these databases do not contain the labels associated with training a ML model and therefore cannot be directly used by supervised learning methods. To this end, various implementations described herein combine transfer learning and data augmentation in several applications to enable the use of information in unlabeled auxiliary datasets in ML models. In doing so, future model performance can be improved for groups that are under-represented in training data while still maintaining good overall model performance.

By way of a specific, non-limiting example, a set of training data can include resumes from candidates who applied to data science jobs, where women are under-represented. ML models built on this set of resumes to predict hiring outcomes can have poorer performance for women as a result of this under-representation. Separately, a second set of resumes from women data scientists and/or applications could be obtained from external sources, e.g., professional organizations or networks, conferences, other companies, or the like. These resumes can serve as auxiliary data but do not contain hiring outcome labels (e.g., hire, no hire, etc.). Accordingly, implementations as described herein can extract useful features and/or signals from the unlabeled auxiliary dataset to improve the model performance for women in the training data with minimal to no impact on the overall model performance, e.g., as expressed in terms of the quality of selected candidates. While various implementations are described herein in relation to this specific use case, it is noted that references to this use case are provided merely for purposes of explanation and are not intended to limit the scope of this description or the claimed subject matter. Other applications of the techniques described herein are also described below, e.g., with reference to FIG. 8.

As further shown in FIG. 1, the model management device 10 of system 100 can include a processor 12 and a memory 14, which can be utilized to facilitate various functions of the model management device 10. For instance, the memory 14 can include a non-transitory computer readable medium that contains computer executable instructions, and the processor 12 can execute instructions stored by the memory 14. For simplicity of explanation, various actions that can be performed via the processor 12 and the memory 14 of the model management device 10 are shown and described below with respect to various logical components. In an aspect, the components described herein can be implemented in hardware, software, and/or a combination of hardware and software. For instance, a logical component as described herein can be implemented via instructions stored on the memory 14 and executed by the processor 12. Other implementations of various logical components could also be used, as will be described in further detail where applicable.

By utilizing various implementations as described herein, various advantages that can improve the performance of a computing system, and/or ML models managed by a computing system, can be realized. These advantages can include, but are not limited to, the following. Techniques described herein can generate ML models and outputs that are more inclusive without compromising on model performance, which can allow users to improve their use cases in terms of inclusivity and fairness. Additionally, techniques described herein can enable improvement of inclusion and bias reduction, without the use of collection and/or labeling of additional data samples, by making use of existing unlabeled databases that can be reused, either as-is or with modification, for different use cases. Moreover, techniques described herein can allow for incorporation of additional features for under-represented groups, e.g., as extracted from an auxiliary database, that may not be present in model training data. Other advantages are also possible.

In the following description, the following notations are utilized:

$y_T$: Labels for the training dataset.

$X_T$: Feature set for the training dataset.

$y_A$: (Pseudo-) labels for the auxiliary dataset.

$\tilde{y}_A$: Perturbed (pseudo-) labels for the auxiliary dataset.

$\Psi_C$: Function that maps a feature set to a common feature space.

$\Psi_T$: Function that maps a feature set to unique training dataset features.

$\Psi_A$: Function that maps a feature set to unique auxiliary dataset features.

$M_1$: Initial (de-biased) model.

$M_2$: Final (inclusive) model.

D: Metric to compare distributions.

Figure 2:
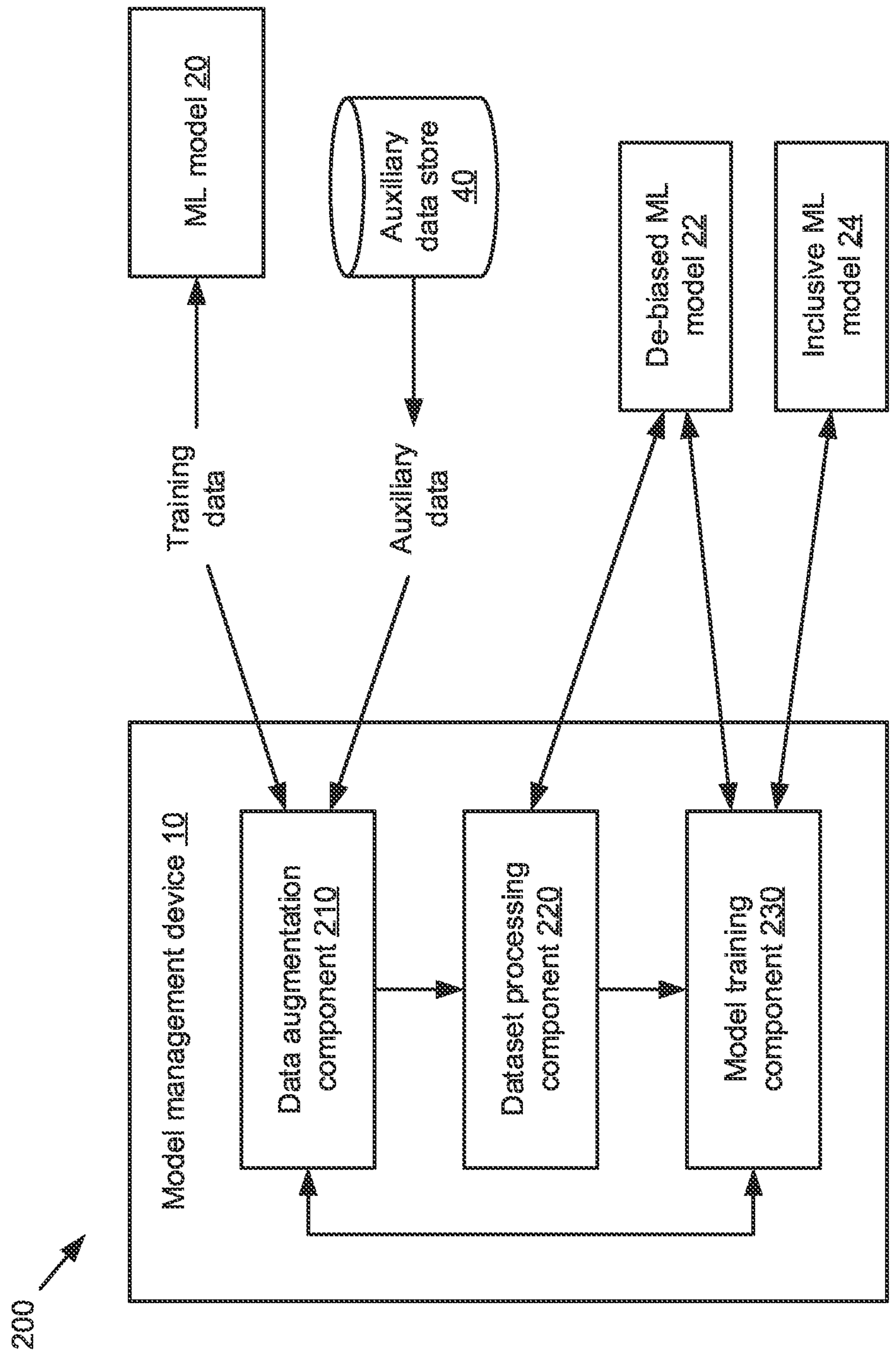
FIG. 2 is a block diagram that depicts the functionality of the model management device of FIG. 1 in further detail in accordance with various aspects described herein.

With reference now to FIG. 2, a block diagram of a system 200 that facilitates transfer knowledge from auxiliary data for more inclusive ML models is illustrated. Repetitive description of like elements employed in other embodiments described herein is omitted for brevity. System 200 as shown in FIG. 2 includes a model management device 10 that can operate in a similar manner to that described above with respect to FIG. 1. The model management device 10 of system 200 includes a data augmentation component 210 that can augment or otherwise associate training data, e.g., training data used to train a first ML model 20, with auxiliary data. Additionally, as will be further described below with respect to FIG. 3, the data augmentation component 210 can generate a common feature space that includes data features that are common to both the training data and the auxiliary data.

In an implementation as shown by FIG. 2, the data augmentation component 210 can obtain auxiliary data from an auxiliary data store 40, which can be a database and/or other data structure containing data that can be utilized by the data augmentation component 210. As will be described in further detail below, the auxiliary data can include data relating to groups that are not represented, or under-represented, in the training data associated with the first ML model 20. By way of example, the auxiliary data store 40 could be a data repository that is associated with a same computing device as the model management device 10 and/or a different device. In one implementation, such an auxiliary data store 40 can be an existing data repository, an open source repository, that is maintained by an organization or other group for various purposes. As an example with reference to the resume use case described above, the auxiliary data store 40 could be associated with a women in data science organization, or other suitable organization, that maintains a membership list with corresponding resumes. It is noted that an auxiliary data store 40 as described herein need not be built for the purpose of training ML models, but could instead be any suitable structure in which relevant data is stored.

In another implementation in which an auxiliary data store 40 containing desired supplemental data does not exist, the data augmentation component 210 could create and/or curate the auxiliary data store 40 for purposes of ML model training and/or other purposes. By way of example, the data augmentation component 210 could be used to develop a repository of resumes or other suitable information, which could then be utilized by the model management device 10 as well as other systems and/or devices.

In one implementation, in response to the data augmentation component 210 generating a common feature space, a model training component 230 of the model management device 10 can train a second ML model, referred to herein as a de-biased ML model 22, with at least a portion of the data features making up the common feature space. Subsequently, a dataset processing component 220 of the model management device 10 can be utilized to generate a combined learned feature representation that encapsulates the data features of the common feature space as well as features that are unique to the training data and features that are unique to the auxiliary data. This process is described in further detail below with respect to FIG. 4. Based on the combined learned feature representation produced by the dataset processing component 220, the model training component 230 can train a third ML model, referred to herein as an inclusive ML model 24. As a result, the performance of the inclusive ML model 24 with respect to under-represented sub-populations can be significantly improved while maintaining a high degree of overall model performance.

In the implementation described above, the model management device 10 shown in FIG. 2 can utilize a three-stage approach. In the first stage, as will be described in further detail below with respect to FIG. 3, the model management device 10 (e.g., via the data augmentation component 210) can use data augmentation to construct a de-biased model that can be used to create pseudo-labels for the auxiliary dataset. In the second stage, as will be described in further detail below with respect to FIG. 4, the model management device (e.g., via the dataset processing component 220) can extract "inclusive" features from the auxiliary dataset, i.e., features that were not included in the original training dataset. In the third stage, the model management device 10 (e.g., via the model training component 230) can train a final model using the resulting feature representations and pseudo-labeled auxiliary dataset. Following this description, FIG. 5 presents a graphical illustration of these three stages.

In an alternative implementation, as described in further detail below with respect to FIG. 7, the feature space generated by the data augmentation component 210 can be composed simply of the data features present in the training data. The data augmentation component 210 can then iteratively remove features from the feature space, based on the auxiliary data, until the feature space is sufficient for training the inclusive ML model 24 without training the de-biased ML model 22. This implementation could be used, e.g., in cases where sufficient training data is present to train an accurate inclusive ML model 24, to yield similar performance benefits as the previously described implementation.

Figure 3:
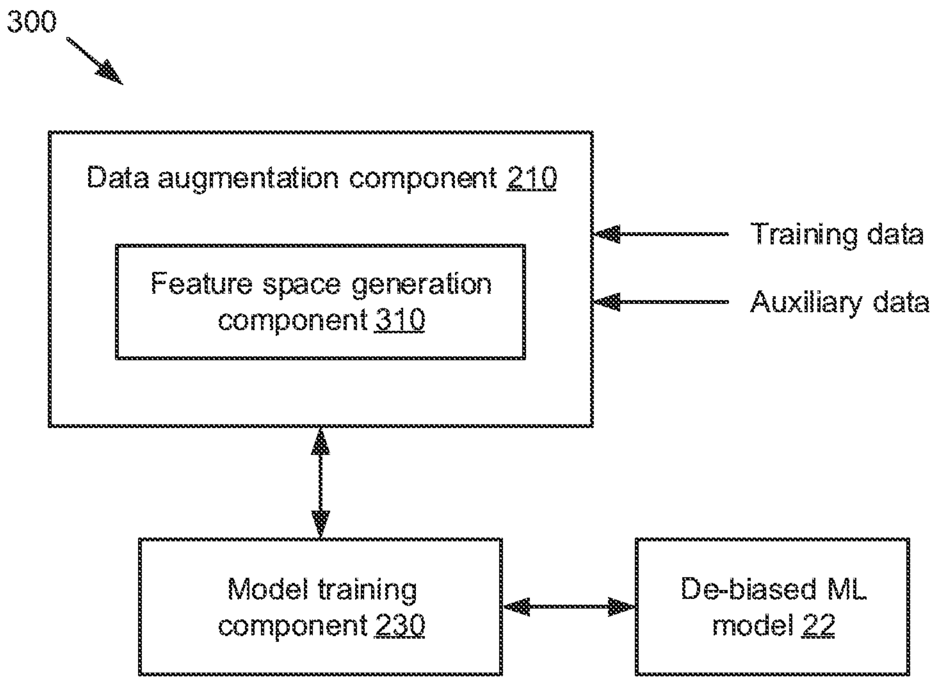
FIG. 3 is a block diagram of a system that facilitates dataset generation for training a de-biased machine learning model in accordance with various aspects described herein.

Referring now to FIG. 3, a block diagram of a system 300 that facilitates dataset generation for training a de-biased ML model 22 is illustrated. Repetitive description of like elements employed in other embodiments described herein is omitted for brevity. System 300 as shown in FIG. 3 includes a data augmentation component 210 and a model training component 230 that can operate as described above with respect to FIG. 2. As further shown in FIG. 3, the data augmentation component 210 includes a feature space generation component 310 that can generate a common feature space from the training data and auxiliary data received via the data augmentation component 210, e.g., as described above. In an implementation, this common feature space can include features that are common to the training data and the auxiliary data, i.e., features that are present in both datasets. This common feature space can then be utilized by the model training component 230 to train a de-biased ML model 22.

In an implementation, system 300 as shown by FIG. 3 can represent a first processing stage for training data and auxiliary data received by the data augmentation component 210, in which the feature space generation component 310 can learn a mapping from $X_T$ (representing the training data features) and $X_A$ (representing the auxiliary data features) to a de-biased common feature space represented by the function $\Psi_C(\bullet)$. The common feature space can include features that are present in both the training data and the auxiliary data. The function $\Psi_C(\bullet)$ can project $X_T$ and $X_A$ to a feature space such that the projected distributions are similar for both the majority and minority classes.

Subsequently, the model training component 230 can train the corresponding de-biased model $M_1$. In an implementation, this can be accomplished by optimizing $D(\psi_C(X_T), \Psi_C(X_A))$, where D is a metric to compare distributions. By way of non-limiting example, D can represent the Kullback-Leibler (KL) divergence metric, such that the KL divergence between $\Psi_C(X_T)$ and $\Psi_C(X_A)$ can be minimized. At this stage, the de-biased model $M_1$ can be utilized to reduce bias; however, further improvements to model performance can be achieved by including features that are unique to the majority and/or minority classes, e.g., as described below.

Figure 4:
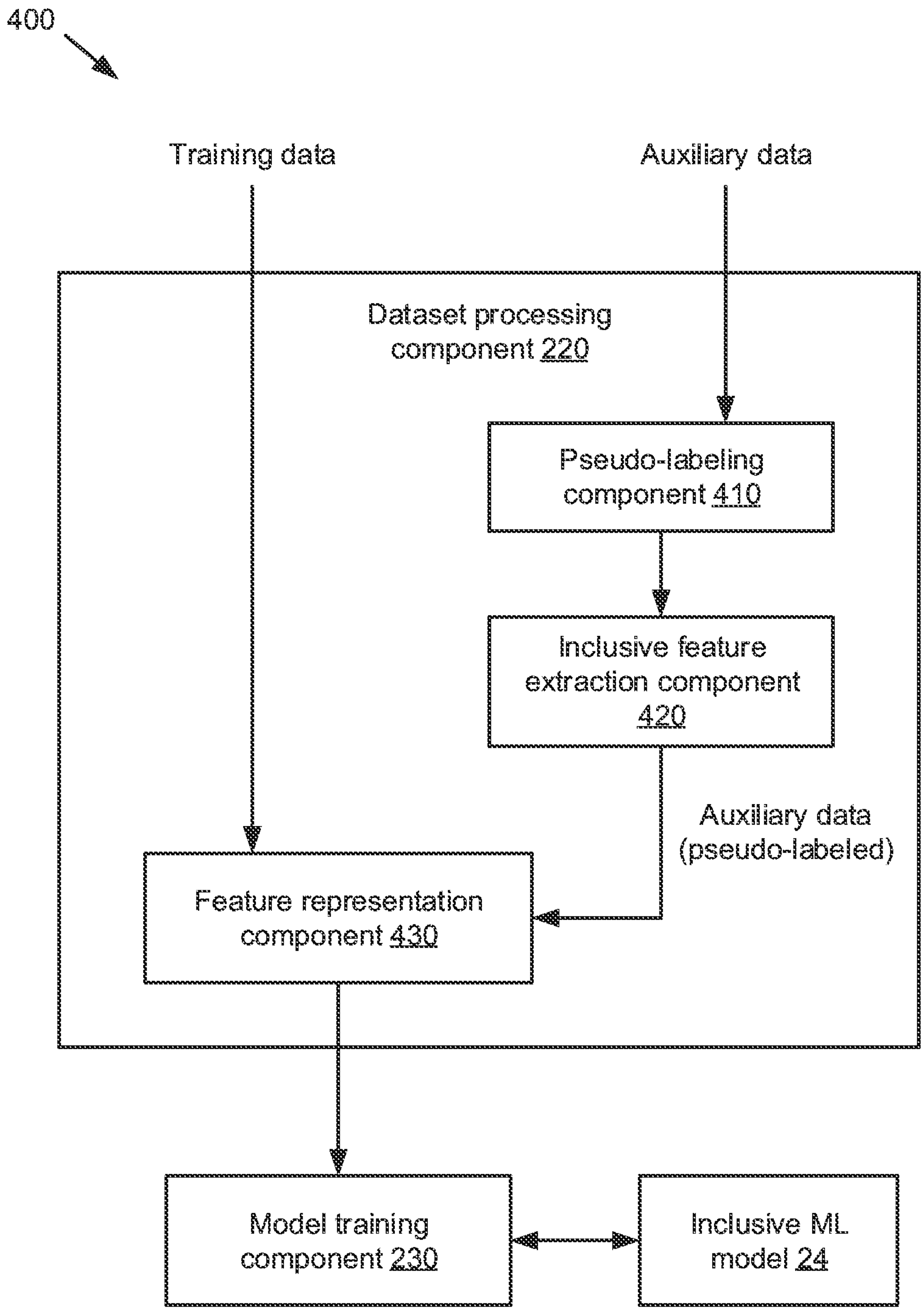
FIG. 4 is a block diagram of a system that facilitates labeling auxiliary data for machine learning model training in accordance with various aspects described herein.
Figure 5:
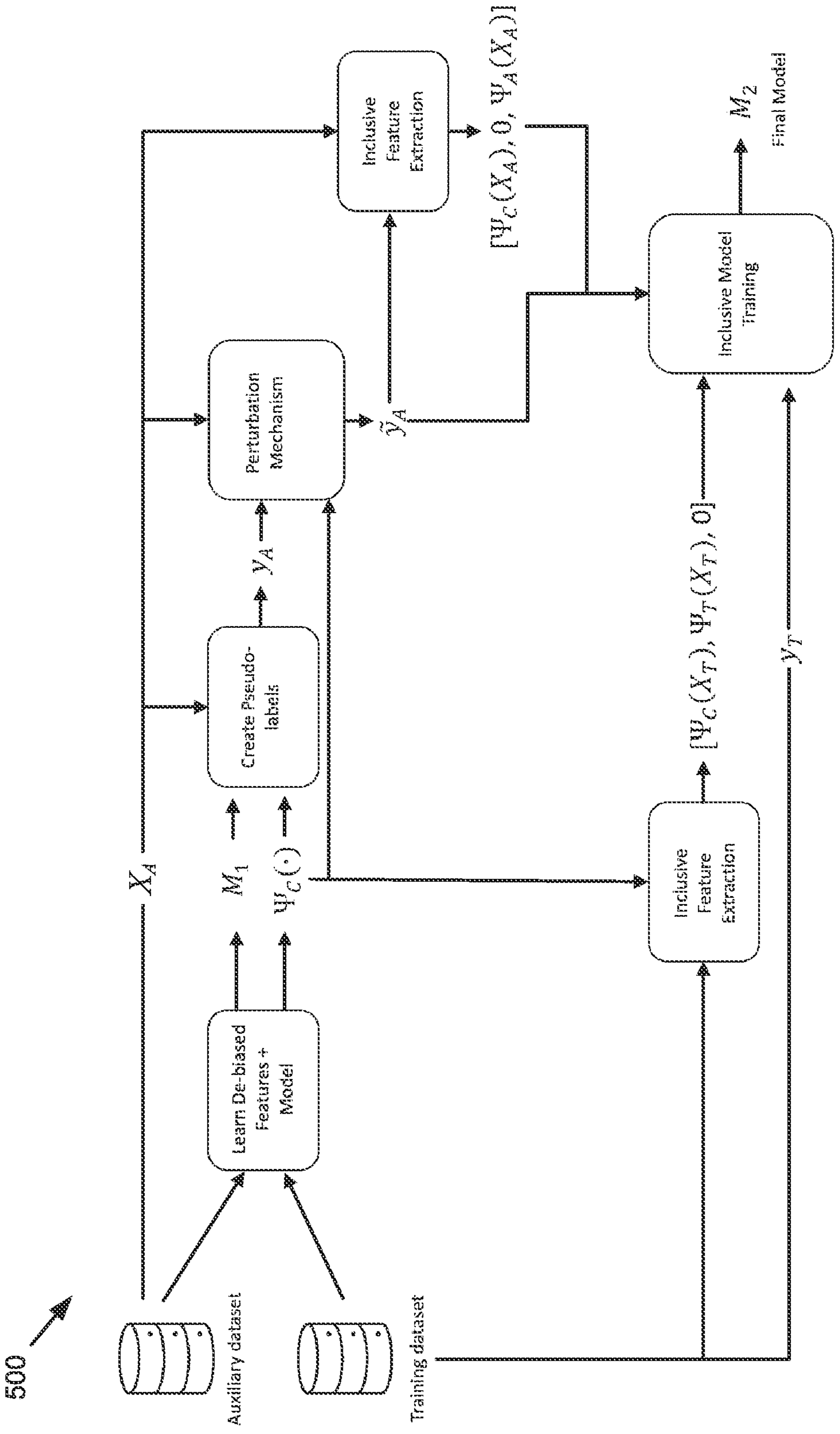
FIG. 5 is a diagram depicting an example framework that can be utilized for transfer knowledge from auxiliary data for more inclusive machine learning models in accordance with various aspects described herein.

Turning to FIG. 4, a block diagram of a system 400 that facilitates labeling auxiliary data for ML model training is illustrated. Repetitive description of like elements employed in other embodiments described herein is omitted for brevity. System 400 as shown in FIG. 4 includes a dataset processing component 220, which in turn includes a pseudo-labeling component 410, an inclusive feature extraction component 420, and a feature representation component 430. The pseudo-labeling component 410 can facilitate classification of the auxiliary data via a ML model, e.g., the de-biased ML model 22 shown in FIG. 3, resulting in labels being applied to those data features via the ML model. Based on labels applied to the auxiliary data via the ML model, the pseudo-labeling component 410 can alter at least a portion of the labels applied by the ML model according to a perturbation mechanism and/or other means to derive pseudo-labels for the auxiliary data.

The inclusive feature extraction component 420 of the dataset processing component 220 can determine data features that are unique to the auxiliary data received by the data augmentation component 210, i.e., features that are represented in the auxiliary data and not represented in the training data.

As further shown by FIG. 4, the feature representation component 430 can process the training data (with labels applied by the original ML model 20 shown in FIG. 2) and auxiliary data (with pseudo-labels applied as described above) via a de-biased model, e.g., the de-biased ML model 22 shown in FIG. 3, to determine a combined learned feature representation for the training and auxiliary data, which can be provided to the model training component 230 for use in training an inclusive ML model 24.

In an implementation, system 400 as shown by FIG. 4 can represent a second processing stage (that follows the first processing stage shown by FIG. 3), in which inclusive features can be extracted from the auxiliary dataset that were not included in the original main dataset. With reference to the specific, non-limiting example of a hiring decision model, these features could include, e.g., the token "Smith," corresponding to the women's college Smith College.

In order to accomplish this, the pseudo-labeling component 410 can create pseudo-labels for the auxiliary database. The pseudo-labeling component 410 can start with the de-biased model $M_1$ from the first processing stage, e.g., the de-biased ML model 22 shown in FIG. 3. It is noted that applying this model directly to the auxiliary dataset does not result in identification of inclusive features, since any subsequent model trained using those labels will only be able to learn the signal from the de-biased features from the first processing stage. Instead, the pseudo-labeling component 410 can alter the pseudo-labels to avoid overfitting the de-biased model.

The choice of perturbation mechanism used by the pseudo-labeling component 410 can be task and/or use case dependent. For example, in a binary classification task for selecting job candidates, a perturbation mechanism could change some "non-selected" candidates to "selected" for candidates close to the model's decision boundary, e.g., where the model is unsure or not confident about its predictions. By doing so, the pseudo-labeling component 410 can introduce a measure of noise into the dataset such that new models trained on the resulting dataset will not merely return the parameters of the previous de-biased model.

The perturbed labels generated by the pseudo-labeling component 410 can then be used to learn a feature representation, e.g., by the feature representation component 430, for inclusive features form the auxiliary dataset that are not captured in the common feature space but are predictive of high-quality samples for the minority class. As used herein, this feature representation is captured by the mapping function $\Psi_A(\bullet)$. Additionally, inclusive features from the training dataset that are not captured in the common feature space can be extracted in this stage through the mapping function $\Psi_T(\bullet)$.

In a third processing stage, i.e., a processing stage that follows the processing stages shown by FIG. 3 and FIG. 4, respectively, the model training component 230 can train and output an inclusive model $M_2$. This model can take as inputs $y_T$ (representing the labels for the training data), $\tilde{y}_A$ (representing the perturbed pseudo-labels for the auxiliary data), and the combined learned feature representations from the first two stages, denoted by the following:

$$[\Psi_C(\bullet),\Psi_T(\bullet),\Psi_A(\bullet)]=F(\bullet).$$

Here, $\Psi_T(X_A)$ and $\Psi_A(X_T)$ map to zero vectors. Given the distributional differences between the training data and the auxiliary dataset, the model training component 230 can train the model using an approach to identify subparts of the training distribution that are similar to the auxiliary data distribution in combination with an instance-based transfer learning approach, e.g., as known in the art.

Diagram 500 in FIG. 5 depicts a graphical representation of the three processing stages described above with respect to FIGS. 3-4. As shown in diagram 500, learning of the de-biased features and model occurs in the first stage; creation of pseudo-labels, perturbation, and inclusive feature extraction occur in the second stage; and inclusive model training occurs in the third stage.

Figure 6:
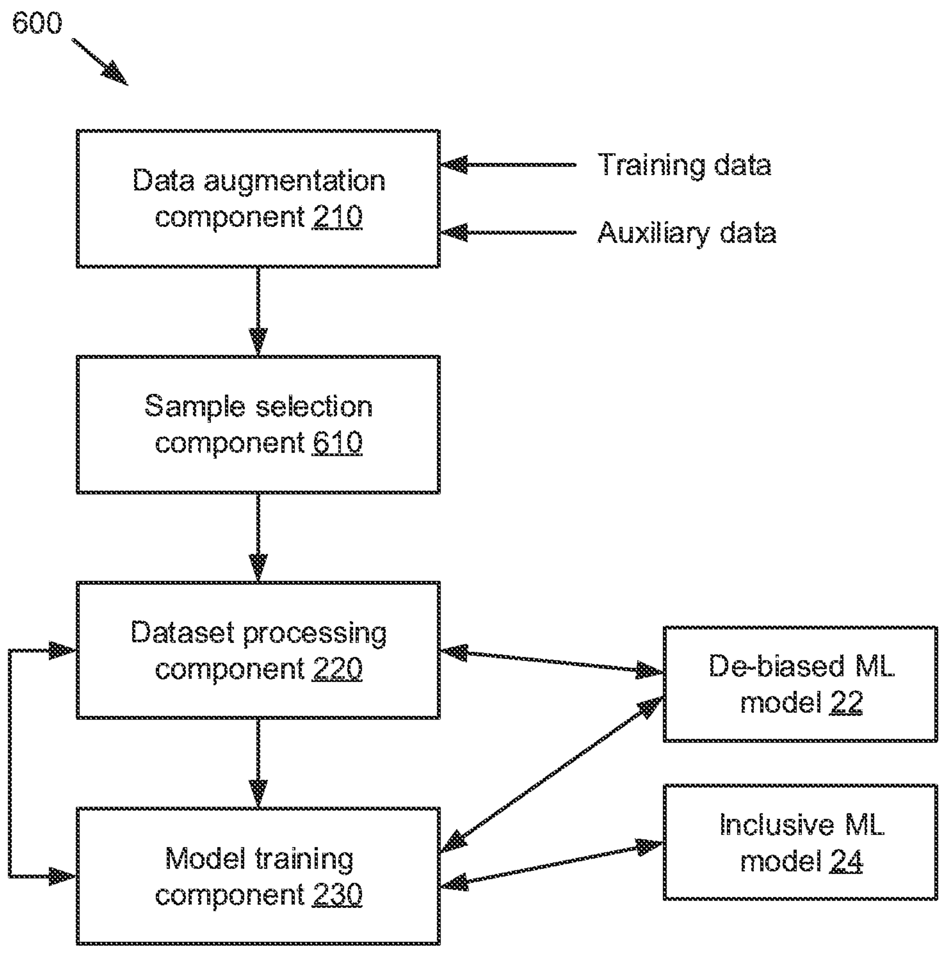
FIG. 6 is a block diagram of a system that facilitates inclusive machine learning model training via a one-pass technique in accordance with various aspects described herein.

Turning now to FIG. 6, a block diagram of a system 600 that facilitates inclusive ML model training via a one-pass technique is illustrated. Repetitive description of like elements employed in other embodiments described herein is omitted for brevity. System 600 as shown in FIG. 6 depicts an alternative to the third processing stage described above, in which selected features of the training dataset are selected for training the inclusive ML model 24. To this end, system 600 includes a sample selection component 610 that can remove a transformed subset of data features, from the common feature space generated by the data augmentation component 210 as described above, that represent cases that are not relevant to capturing model bias. For instance, the sample selection component 610 can isolate features of the training data that are similar to features of the auxiliary data, e.g., by removing features from the combined dataset generated by the data augmentation component 210 that have a distribution in the training data that differs from a distribution of the same features in the auxiliary data by a threshold amount.

In an implementation, the sample selection component can perform a one-pass adversarial technique based on two terms: a first term that identifies the parts of the training distribution that are "similar" to the auxiliary distribution, and a second term that represents a classification error on these "similar" parts of the training data.

Stated another way, the sample selection component 610 can first find a sub-region (referred to herein as $Z_1$) in the image space $F(X_T)$ such that the transformed training distribution (e.g., the distribution of $F(X_T)$) is close, in a metric sense, to the transformed auxiliary distribution (e.g., the distribution of $F(X_A)$). Subsequently, a second term can simultaneously be used to attempt to minimize the training error of misclassification when the transformed data is restricted to $Z_1$. For the region $Z_1$ to be a meaningful representation of the transformed training data, a condition can be imposed that $Z_1$ contains at least a proportion of points in the transformed set $F(X_T)$. For regularization, $Z_1$ can be constrained to have a simple structure, such as an open ball, relative to a metric on the transformed space.

Additionally, $Z_1$ and $Z_2$ can be defined to be exhaustive, disjoint subsets of $F(X_T)$. A distance metric $D_1$ can further be used on the space of distributions of the outcomes of $F(\bullet)$. The following expression can then be defined:

$$(F(X_T))_{Z_1}\sim F_1;F(X_A)\sim F_A,$$

where $(F(X_T))_{Z_1}$ is the distribution of $F(X_T)$ restricted to $Z_1$. The first term of the above expression can be used to minimize $D_1$ $(F_A, F_1)$, with $X_1$ taking a simple structure such as an open ball with respect to some metric. The second term can include error terms $D_l(y_t,h(F(X_t)))$, restricting to $F(X_t) \in Z_1$ where $D_l(\bullet,\bullet)$ provides the error due to misclassification and h is a risk minimization operator. Here, $t \in T$ is an index for the training set.

To make the result also dependent on $Z_2=F(X_T)\backslash Z_1$, the following expression can also be used:

$$b\cdot 1(F(X_T)\in Z_1)D_l(y_t,h(F(X_t)))+(1-b)\cdot 1(F(X_T)\in Z_2)D_l(y_t,h(F(X_t))),$$

such that the one-pass algorithm can minimize the following:

$$\dot{h}, \dot{Z}_1 = \arg\min\begin{pmatrix} D_1(F_1, F_A) + \\ b\cdot 1(F(X_T)\in Z_1)D_l(y_t, h(F(X_t))) + \\ (1-b)\cdot 1(F(X_T)\in Z_2)D_l(y_t, h(F(X_t))) \end{pmatrix}$$

over a function h and a simple subset $Z_1$ of F ($X_T$). Here, b>0 is a small number that could be user-dependent. In this case, the output for the auxiliary dataset would be $\dot{h}(F(X_A))$, where A is the index for the auxiliary set.

Figure 7:
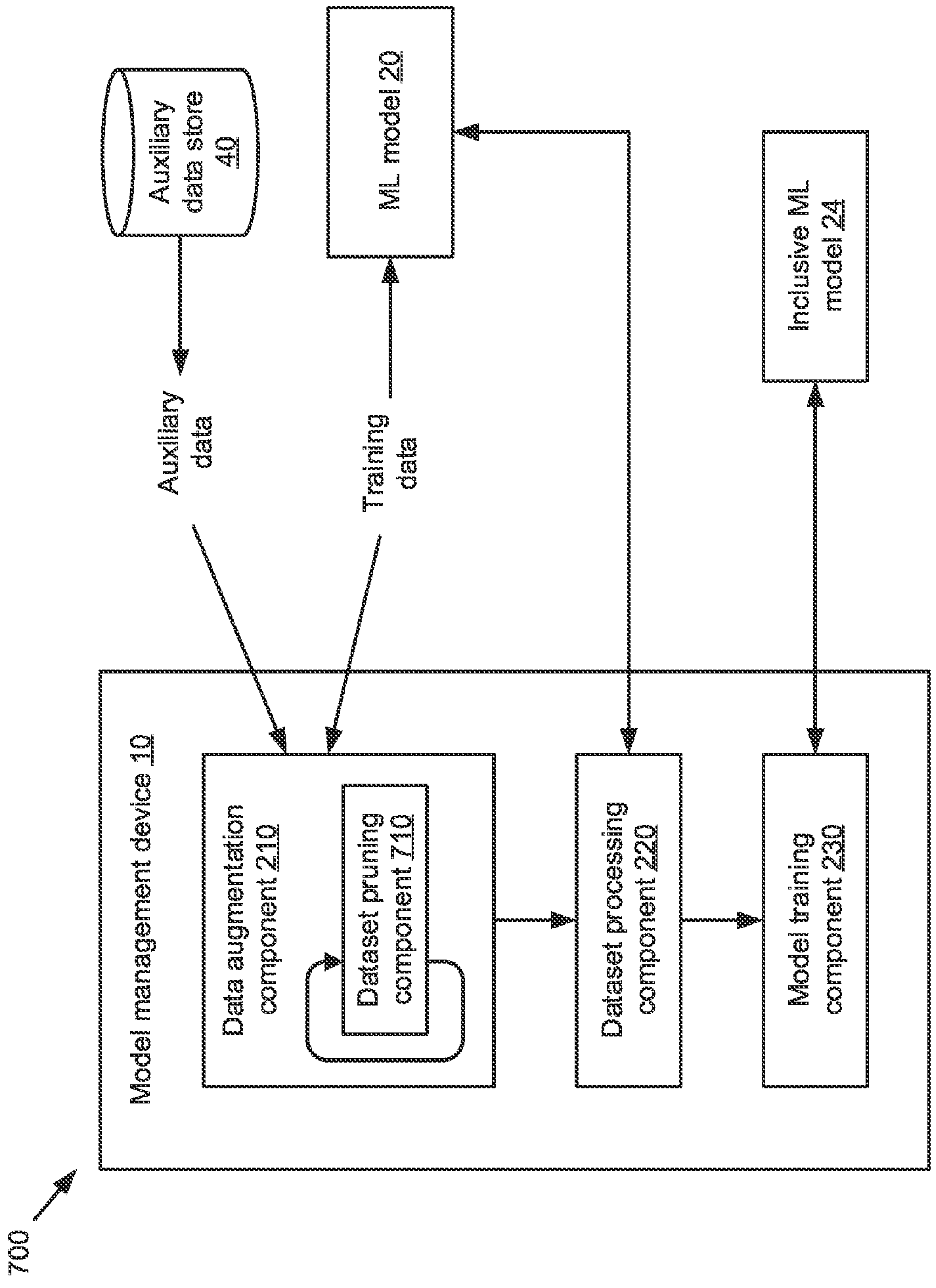
FIG. 7 is a block diagram of a system that facilitates inclusive machine learning model training via feature removal in accordance with various aspects described herein.

Referring next to FIG. 7, a block diagram of a system 700 that facilitates inclusive ML model training via feature removal is illustrated. Repetitive description of like elements employed in other embodiments described herein is omitted for brevity. System 700 as shown in FIG. 7 includes a model management device 10 having a data augmentation component 210, a dataset processing component 220, and a model training component 230, which can function as described above with respect to FIG. 2.

The data augmentation component 210 shown in FIG. 7 includes a dataset pruning component 710, which can facilitate generation of a dataset for training an inclusive ML model 24 via feature removal. In contrast to the techniques described above with respect to FIGS. 3-5, the dataset pruning component 710 can remove respective data features from a set of training data, e.g., such that a remaining dataset is provided to the model training component 230. As described in further detail below, the dataset pruning component 710 can iteratively remove respective data features present in the training data until either (1) a desired amount of data features, e.g., according to various criteria, are removed from the training data or (2) the accuracy of the de-biased ML model 22 resulting from removal of data features differs from the accuracy of the model with said features present by at least a threshold amount.

In an implementation, the dataset pruning component can be utilized to replace the three processing stages described above with respect to FIGS. 3-5, in cases in which the set of features in $X_T$ is rich enough, by removing features form the set $X_T$ and training the model over the reduced set. For purposes of this implementation, it is assumed that some features in the training set are causing a bias. Accordingly, the dataset pruning component 710 can discover these features and ignore them in the training of a new (unbiased) model.

Initially, the feature set of $X_T$ can be partitioned into four groups with respect to the biased model $M_T$ that was trained over $X_T$ and the set of features for the auxiliary dataset $X_A$, as shown by Table 1 below.

TABLE 1

Feature set partitions for feature removal.

| | Significant feature for $M_T$ | Insignificant feature for $M_T$ |
|---|---|---|
| Significant unique feature of $X_A$ | X | X |
| Insignificant unique feature of $X_A$ | ✓ | X |

Based on the partitions shown in Table 1, the dataset pruning component 710 can facilitate, for training the inclusive model $M_2$, only the features that are significant features of $M_T$ and insignificant unique features of $X_A$. As used herein, a feature is significant if removing the feature would significantly affect the accuracy of the model (e.g., based on the accuracy of the model changing by more than a threshold amount). As additionally used herein, features are unique to $X_A$ if their distribution in $X_A$ is significantly different from their distribution in $X_T$.

Using the above definitions, the dataset pruning component 710 can find a set of features that (1) cannot be used for distinguishing between the training dataset and the auxiliary dataset, and (2) are sufficient for accurately training a model over the training dataset.

In an implementation, the dataset pruning component 710 can operate according to a three-part iterative process, as follows:

(1) Initially, a dataset $X_I$ is set to equal $X_T$.

(2) In each processing step, a feature is removed from $X_I$ if (a) after the removal, $X_I$ is still sufficient for training an accurate model, and (b) the feature is a feature that can be used for distinguishing between the training set and the auxiliary set.

(3) When it becomes impossible to distinguish between elements in the training dataset and elements in the auxiliary dataset based on the features of $X_I$, $X_I$ can be returned as the resulting set of features, and these features can be used to train the inclusive model $M_2$.

If the dataset pruning component 710 cannot find an attribute to remove from $X_A$ such that the training of a model over $X_A$ still yields an accurate model, while there are still attributes that allow distinguishing between the training set and the auxiliary set, then operation of the dataset pruning component 710 can terminate, and training of the inclusive ML model 24 can instead proceed as described above with respect to FIGS. 3-5.

In some implementations, training of the inclusive ML model 24 can proceed according to a combination of the techniques described with respect to FIGS. 3-5 and the techniques described above with respect to FIG. 7. For instance, the dataset pruning component 710 could be used to remove a subset of features from the training data that are known to cause bias, and then further processing can be performed for the remaining features as described with respect to FIGS. 3-5.

Figure 8:
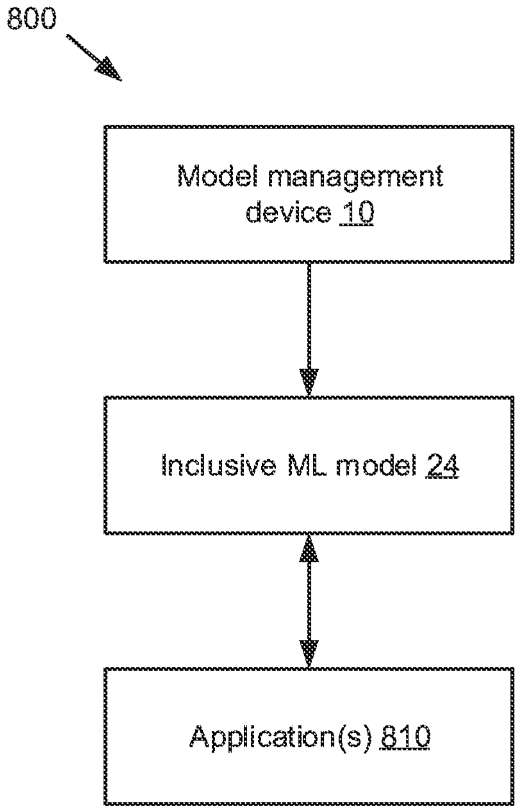
FIG. 8 is a block diagram of a system that facilitates use of an inclusive machine learning model via respective applications in accordance with various aspects described herein.

Turning now to FIG. 8, a block diagram of a system 800 that facilitates use of an inclusive ML model 24 via respective applications 810 is illustrated. Repetitive description of like elements employed in other embodiments described herein is omitted for brevity. System 800 as shown in FIG. 8 includes a model management device 10, which can develop and/or train an inclusive ML model 24 in accordance with various implementations described above. As further shown in system 800, the inclusive ML model 24 can be utilized by respective applications 810, e.g., applications that utilize ML for prediction or other purposes. By utilizing an inclusive ML model 24 as shown in system 800, the respective applications 810 can operate in a more inclusive manner while still maintaining a desired level of model performance.

In addition to the example of an inclusive ML model 24 for hiring decisions as described above, application(s) 810 shown in FIG. 8 can be any suitable type of application that utilizes ML models for any aspect of their operation. Respective examples of applications 810 that can be used are provided in the following description. It is noted, however, that other applications 810 are also possible.

In one example, the inclusive ML model 24 of system 800 can be used to improve diversity and inclusion for predicting movie success, e.g., measured by revenue, ranking, and/or other metrics. For instance, the model management device 10 can use an auxiliary database of scripts written by female writers to improve predictions of success for their movies. Such an auxiliary database could include only movie scripts, or alternatively other types of works could be used, such as television scripts, novels, or the like.

If both male and female scripts are treated equivalently by an ML algorithm, the presence of a lower proportion of female writers (and scripts) could result in a biased model that has poorer performance for the female writers because of the under-representation, while still producing good accuracy overall in the training set due to the low prevalence of scripts by female writers. By utilizing auxiliary data as described herein, the model performance for female writers, and/or other groups, could be improved without sacrificing overall model performance Additionally, it is noted that some scripts written by women, or other under-represented groups, may reach a different audience from scripts written by men or other majority groups. In this case, a biased model may not be able to predict these audience trends. Stated another way, poorer model performance may not be just the result of the size of the training data, but could also be caused by not properly addressing the features of the target audience. The model management device 10 extract and use these additional features, that may only be present in the auxiliary dataset, to improve model fairness and performance, especially for under-represented groups.

As another example, the inclusive ML model 24 can be used to improve overall user experience for augmented reality (AR) applications and/or other location-based applications, such as location-based games or the like. For instance, in an AR game that maps virtual objects to real-world locations, a biased model could result in the distribution of these virtual objects to be sparser in minority neighborhoods, rural areas, or the like. By using inclusive maps that contain data features corresponding to these under-represented areas, the game can be more inclusive and provide a similar gaming experience to all users by, e.g., determining locations for respective virtual objects in a more equitable manner.

As still another example, the inclusive ML model 24 can be used to improve artificial intelligence (AI)-based financial decisions, such as approving credit, mortgages, or the like. For instance, conventional ML models for these applications could provide poorer outcomes to people with unconventional credit histories, e.g., a recent immigrant without an established credit history in their new country. By using the inclusive ML model 24, decisions for such people can be different from those made for people with more conventional credit histories.

As a further example, an AI-based health application can be adapted to a larger variety of populations, e.g., by utilizing an inclusive ML model 24 based on different datasets included in the training process. This could help evaluating and treating cases where, e.g., diverse populations have different symptoms for the same condition.

As yet another example, an inclusive ML model 24 can be used for applications that include facial recognition, voice recognition, or the like. For instance, the inclusive ML model 24 can be trained for a larger variety of people via incorporation of auxiliary data (e.g., data features for multiple voice accents, etc.) as described above, improving user experience for historically under-represented groups.

Figure 9:
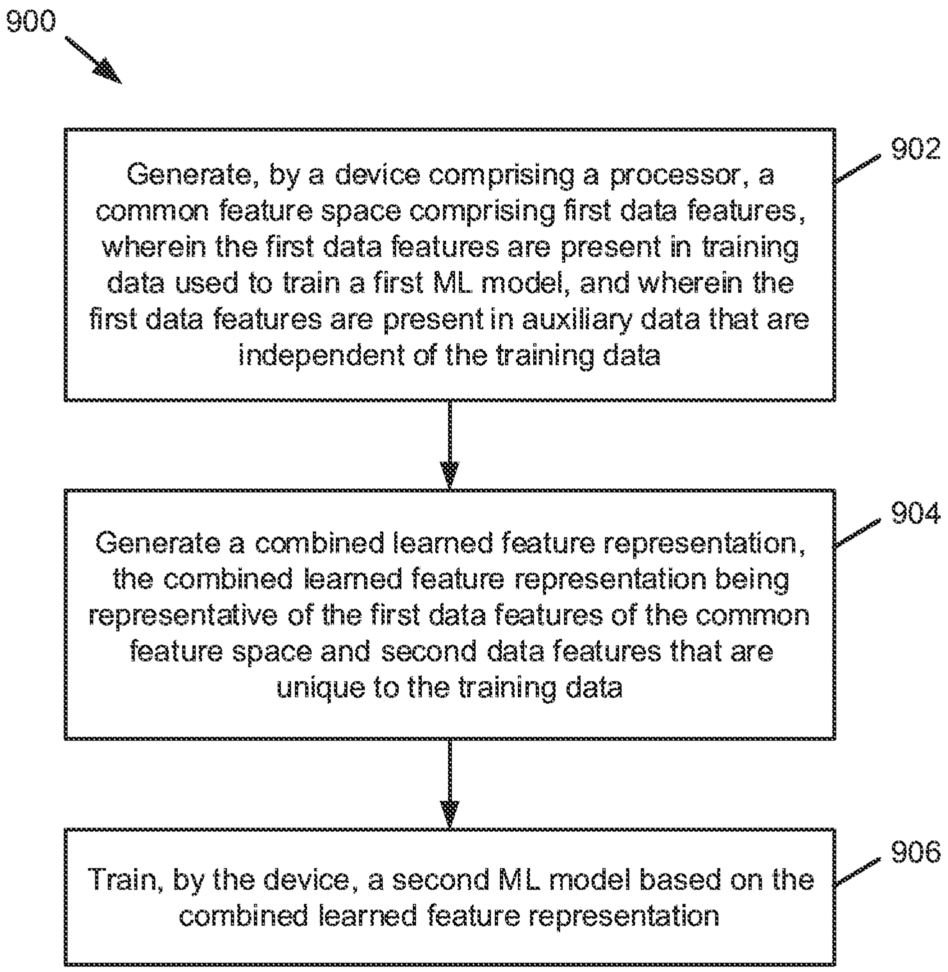
FIGS. 9-11 are flow diagrams of respective methods that facilitate transfer knowledge from auxiliary data for more inclusive machine learning models in accordance with various aspects described herein.

With reference now to FIG. 9, a flow diagram of a method 900 that facilitates transfer knowledge from auxiliary data for more inclusive ML models is presented. At 902, a device comprising a processor (e.g., a model management device 10 comprising a processor 12) can generate (e.g., by a data augmentation component 210 and/or other components implemented by the processor 12) a common feature space that includes first data features that are present in both training data, with which a first ML model (e.g., an ML model 20) is trained, and auxiliary data (e.g., data from an auxiliary data store 40) that are independent of the training data.

At 904, the device can generate (e.g., by a dataset processing component 220) a combined learned feature representation. This representation can be representative of, e.g., the first data features of the common feature space as described above with respect to 902 and second data features that are unique to the training data.

At 906, the device can train (e.g., by the model training component 230 and/or other components implemented by the processor 12) a second ML model (e.g., an inclusive ML model 24) based on the combined learned feature representation generated at 906.

Figure 10:
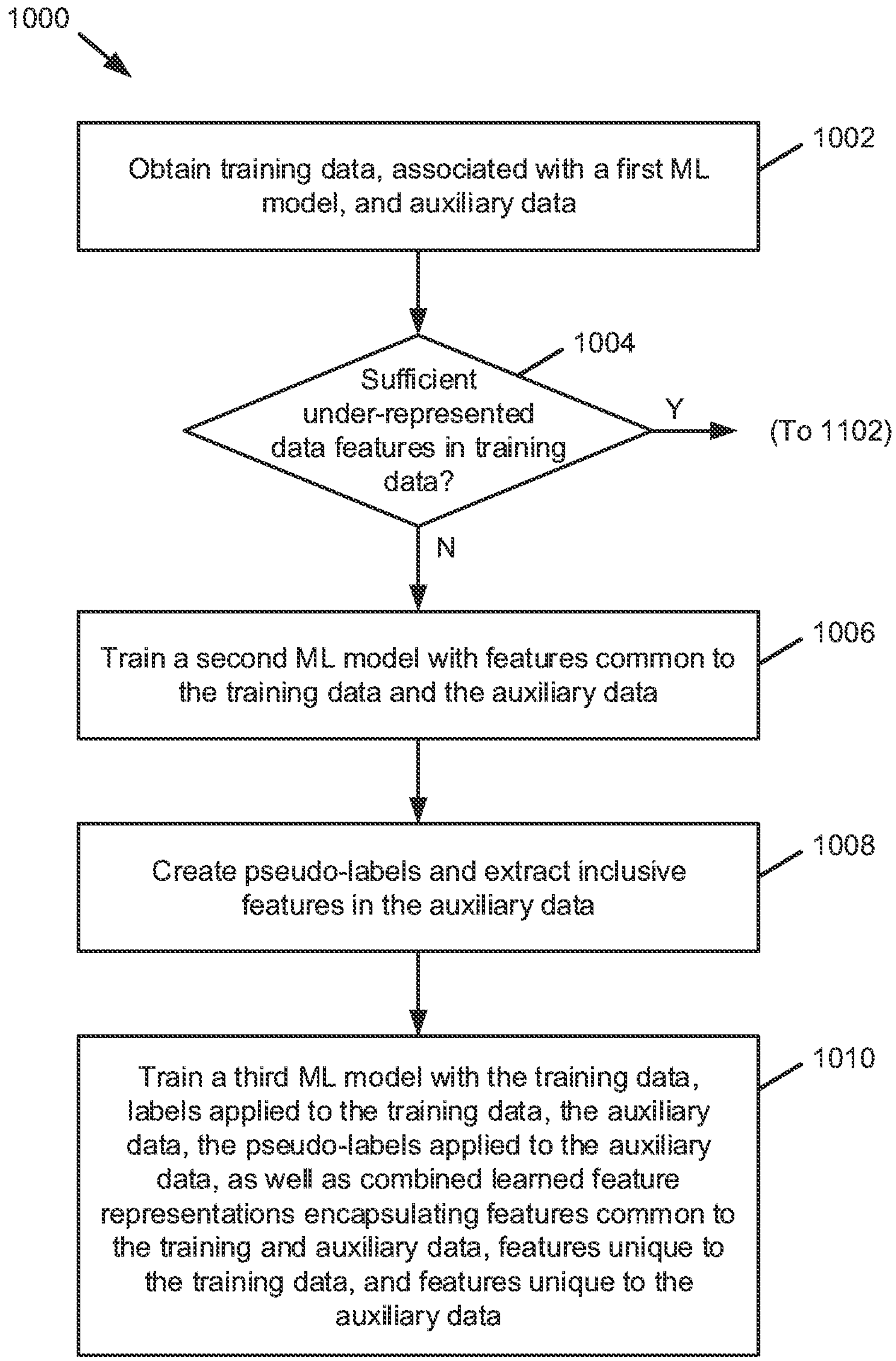

Turning to FIG. 10, a flow diagram of another method 1000 that facilitates transfer knowledge from auxiliary data for more inclusive ML models is presented. As shown in FIG. 10, method 1000 can interact with respective stages of method 1100 illustrated by FIG. 11, which will be described in further detail below.

At 1002, a device (e.g., a model management device 10) can obtain (e.g., via a data augmentation component 210) training data, associated with a first ML model (e.g., a ML model 20), and auxiliary data, e.g., in a manner similar to that described above at 902 of method 900.

At 1004, it is determined whether sufficient data features for any under-represented groups are present in the training data, e.g., whether the training dataset is rich enough to provide an inclusive ML model without impacting model accuracy. If sufficient features are found, the device can initiate method 1100 at 1004, e.g., by branching to 1102 as will be described below. If sufficient features are not found, method 1000 instead proceeds to 1006.

At 1006, the device can train (e.g., by a model training component 230) a second ML model (e.g., a de-biased ML model 22) with features that are common to the training data and the auxiliary data.

At 1008, the device can pseudo-label (e.g., by a pseudo-labeling component 410) the auxiliary data and extract (e.g., by an inclusive feature extraction component 420) inclusive features present in the auxiliary data.

At 1010, the device can train (e.g., by the model training component 230) a third ML model (e.g., an inclusive ML model 24) with the training data, labels applied to the training data, and auxiliary data as obtained at 1002 with the pseudo-labels applied to the auxiliary data at 1008, in addition to combined learned feature representations that encapsulate features common to the training and auxiliary data as used at 1006, features unique to the training data, and features unique to the auxiliary data as identified at 1008.

Figure 11:
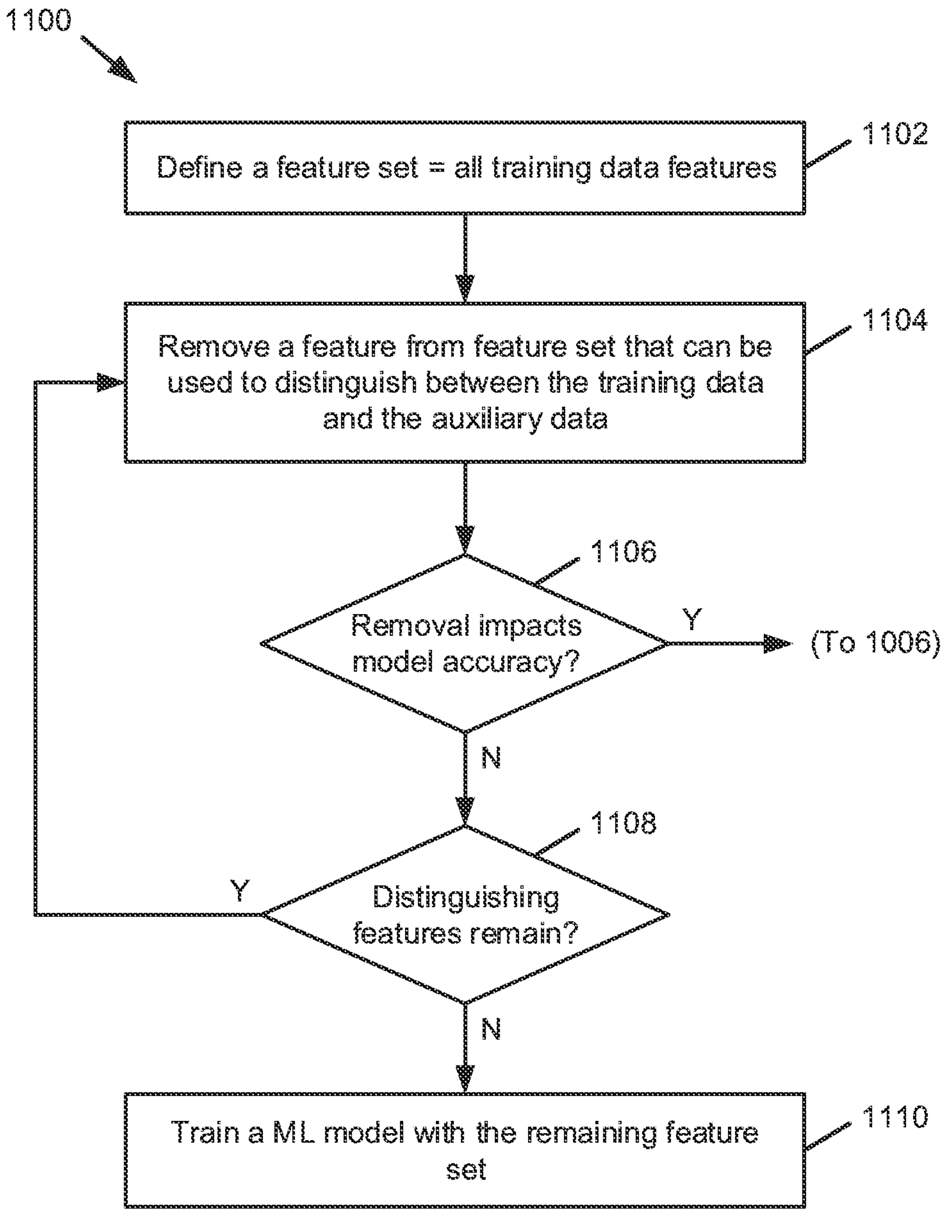

FIG. 11 depicts a flow diagram of still another method 1100 that facilitates transfer knowledge from auxiliary data for more inclusive ML models. As noted above, operation of method 1100 can be initialized from 1004 of method 1000 in response to determining sufficient features for any under-represented group are present in training data. Accordingly, prior to method 1100, a device (e.g., a model management device 10) can obtain training data and auxiliary data as described above with respect to 1002.

At 1102, a device (e.g., a model management device 10) can define a feature set as including all of the features of the training data obtained via 1002.

At 1104, the device can remove (e.g., via a dataset pruning component 710) a feature from the feature set that can be used to distinguish between the training data and the auxiliary data.

At 1106, the device can determine whether removal of the feature as performed at 1104 affects an accuracy of a corresponding ML model (e.g., a de-biased ML model 22) by more than a threshold amount. If so, the device can return to method 1000 at 1106, e.g., by branching to 1006 of method 1000. Otherwise, method 1100 can proceed to 1108.

At 1108, the device can determine whether distinguishing features, e.g., features that can be used to distinguish between the training and auxiliary datasets, remain. If distinguishing features remain, method 1100 can return to 1104 to remove an additional feature.

Upon determining at 1108 that all distinguishing features have been removed, the device can conclude method 1100 at 1110 by training a third ML model (e.g., an inclusive ML model 24) with the remaining feature set.

FIGS. 9-11 illustrate methods in accordance with certain aspects of this disclosure. While, for purposes of simplicity of explanation, the methods are shown and described as a series of acts, it is noted that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 12:
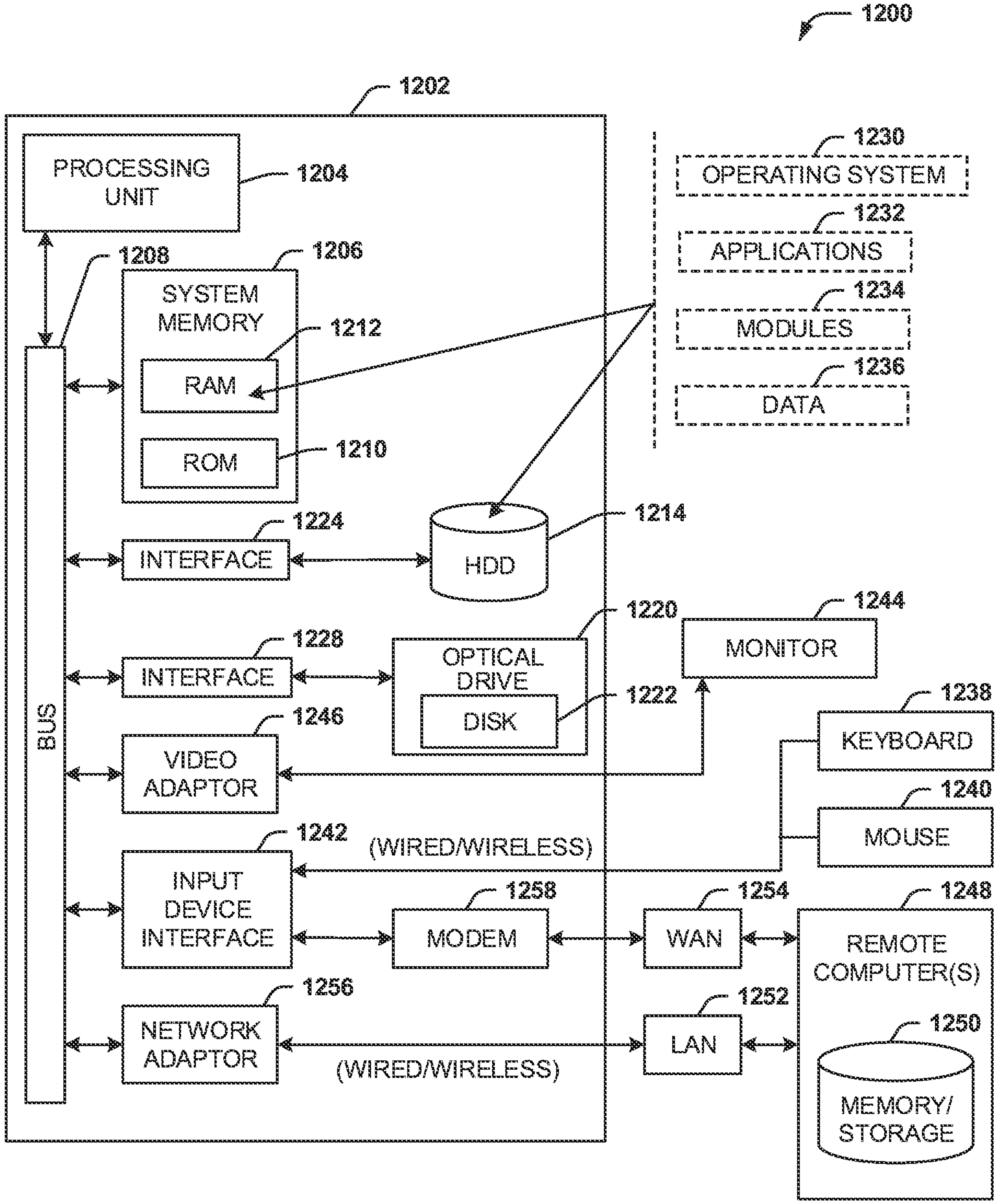
FIG. 12 depicts an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 and an optical disk drive 1220, (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214 and optical disk drive 1220 can be connected to the system bus 1208 by an HDD interface 1224 and an optical drive interface 1228, respectively. The HDD interface 1224 can additionally support external drive implementations via Universal Serial Bus (USB), Institute of Electrical and Electronics Engineers (IEEE) 1394, and/or other interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it is noted by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a USB port, an IR interface, a BLUETOOTH® interface, etc.

A monitor 1244 or other type of display device can be also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also include a wireless access point (AP) disposed thereon for communicating with the wireless adapter 1256.

When used in a WAN networking environment, the computer 1202 can include a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

generating, by a device comprising a processor, a common feature space comprising first data features, wherein the first data features are present in training data used to train a first machine learning model, wherein the first data features are present in auxiliary data that are independent of the training data, and wherein the generating of the common feature space comprises learning a mapping that projects training data features and auxiliary data features into the common feature space by minimizing a divergence between respective projected feature distributions;

training, by the device, an intermediate machine learning model using at least a portion of the first data features in the common feature space;

obtaining, by the device, training-data labels corresponding to the training data;

classifying, by the device, the auxiliary data via the intermediate machine learning model to generate first auxiliary-data labels for the auxiliary data;

generating, by the device, second auxiliary-data labels for the auxiliary data by altering at least a portion of the first auxiliary-data labels for auxiliary data instances having a prediction confidence below a confidence threshold indicative of proximity to a decision boundary of the intermediate machine learning model;

generating, by the device, a combined learned feature representation, the combined learned feature representation being representative of the first data features of the common feature space and second data features that are unique to the training data and auxiliary-data unique features that are unique to the auxiliary data; and training, by the device, a second machine learning model based on the combined learned feature representation, the training-data labels, and the second auxiliary-data labels.

2. The method of claim 1, wherein the learning the mapping comprises minimizing the divergence between the respective projected feature distributions using a Kullback-Leibler (KL) divergence metric.

3. The method of claim 1, wherein the generating of the combined learned feature representation comprises applying: a first mapping function that maps features into the common feature space, a second mapping function that maps to training-data-unique features, and a third mapping function that maps to auxiliary-data-unique features, and wherein for respective training-data instances the third mapping function outputs a zero vector and for respective auxiliary-data instances the second mapping function outputs a zero vector.

4. The method of claim 1, wherein generating the auxiliary-data second labels comprises, for a binary classification task, changing at least one auxiliary-data instance label from a non-selected label to a selected label for auxiliary-data instances determined to be close to the decision boundary of the intermediate machine learning model.

5. The method of claim 1, wherein the method further comprises:

prior to the training of the second machine learning model, removing, by the device and from the combined learned feature representation, a transformed subset of the training data features and the auxiliary data features.

6. The method of claim 1, further comprising:

defining a feature set as including all features of the training data; and removing selected ones of the first data features from the feature set in response to the selected ones of the first data features having a first distribution in the training data that differs from a second distribution of the selected ones of the first data features in the auxiliary data by at least a threshold amount.

7. The method of claim 6, wherein removing the selected ones of the first data features comprises iteratively removing the selected ones of the first data features until a change in accuracy of a machine learning model trained using the feature set.

8. The method of claim 1, further comprising:

in response to the training of the second machine learning model, classifying, by the second machine learning model and based on input medical data, a medical condition associated with the input medical data.

9. The method of claim 1, further comprising:

in response to the training of the second machine learning model, determining, via the second machine learning model, locations for respective virtual objects associated with an augmented reality application.

10. A system, comprising:

a processor; and a memory that stores executable instructions that, when executed by the processor, facilitate performance of operations, the operations comprising:

generating a feature space comprising first data features, wherein the first data features are present in training data used to train a first machine learning model, wherein the first data features are present in auxiliary data that is independent of the training data and wherein the generating of the feature space comprises learning a mapping that projects training data features and auxiliary data features into the feature space by minimizing a divergence between respective projected feature distributions;

training an intermediate machine learning model using at least a portion of the first data features in the feature space obtaining training-data labels corresponding to the training data;

classifying the auxiliary data via the intermediate machine learning model to generate first auxiliary-data labels for the auxiliary data;

generating second auxiliary-data labels for the auxiliary data by altering at least a portion of the first auxiliary-data labels for auxiliary data instances having a prediction confidence below a confidence threshold indicative of proximity to a decision boundary of the intermediate machine learning model;

generating a combined feature representation, the combined feature representation being representative of the first data features and second data features that are unique to the training data and auxiliary-data unique features that are unique to the auxiliary data; and training a second machine learning model using the combined feature representation, the training-data labels, and the second auxiliary-data labels.

11. The system of claim 10, wherein the divergence comprises a Kullback-Leibler (KL) divergence.

12. The system of claim 10, wherein the generating of the combined feature representation comprises applying: a first mapping function that maps features into the feature space, a second mapping function that maps to training-data-unique features, and a third mapping function that maps to auxiliary-data-unique features, and wherein for respective training-data instances the third mapping function outputs a zero vector and for respective auxiliary-data instances the second mapping function outputs a zero vector.

13. The system of claim 12, wherein the generating of the auxiliary-data second labels comprises, for a binary classification task, changing at least one auxiliary-data instance label from a non-selected label to a selected label for auxiliary-data instances determined to be close to the decision boundary of the intermediate machine learning model.

14. The system of claim 10, further comprising:

adding the second data features that are unique to the training data to a feature set comprising the first data features; and removing selected ones of the set of first data features from the feature space-set in response to the selected ones of the first data features having a first distribution in the training data that differs from a second distribution of the selected ones of the first data features in the auxiliary data by at least a threshold amount, resulting in a reduced feature set.

15. The system of claim 14, wherein the threshold amount is a first threshold amount, and wherein the removing of the selected ones of the first data features comprises iteratively removing the selected ones of the first data features from the reduced feature set until a change in accuracy of the intermediate machine learning model, resulting from the iteratively removing of the selected ones of the first data features, is at least a second threshold amount.

16. A non-transitory machine-readable medium, comprising executable instructions that, when executed by a processor of first network equipment, facilitate performance of operations, the operations comprising:

generating a data feature space comprising first data features, wherein the first data features are present in training data used to train a first machine learning model, and wherein the first data features are present in auxiliary data that are independent of the training data, and wherein the generating of the data feature space comprises learning a mapping that projects training data features and auxiliary data features into the data feature space by minimizing a divergence between respective projected feature distributions;

training an intermediate machine learning model using at least a portion of the first data features in the data feature space;

obtaining training-data labels corresponding to the training data;

classifying the auxiliary data via the intermediate machine learning model to generate first auxiliary-data labels for the auxiliary data;

generating second auxiliary-data labels for the auxiliary data by altering at least a portion of the first auxiliary-data labels for auxiliary data instances having a prediction confidence below a confidence threshold indicative of proximity to a decision boundary of the intermediate machine learning model;

generating a learned feature representation, the learned feature representation being representative of the first data features and second data features unique to the training data, and auxiliary-data unique features that are unique to the auxiliary data; and training a second machine learning model based on the learned feature representation, the training-data labels, and the second auxiliary-data labels.

17. The non-transitory machine-readable medium of claim 16, wherein the divergence comprises a Kullback-Leibler (KL) divergence metric.

18. The non-transitory machine-readable medium of claim 16, wherein the generating of the learned feature representation comprises applying: a first mapping function that maps features into the data feature space, a second mapping function that maps to training-data-unique features, and a third mapping function that maps to auxiliary-data-unique features, and wherein for respective training-data instances the third mapping function outputs a zero vector and for respective auxiliary-data instances the second mapping function outputs a zero vector.

19. The non-transitory machine-readable medium of claim 18, wherein the generating of the second auxiliary-data labels comprises, for a binary classification task, changing at least one auxiliary-data instance label from a non-selected label to a selected label for auxiliary-data instances determined to be close to the decision boundary of the intermediate machine learning model.

20. The non-transitory machine-readable medium of claim 16, wherein the operations further comprise: adding second data features that are unique to the training data to a feature set comprising the first data features; and removing selected ones of the first data features from the feature set in response to the selected ones of the first data features having a first distribution in the training data that differs from a second distribution of the selected ones of the first data features in the auxiliary data by at least a threshold amount, resulting in a reduced feature set.

* * * * *